UNITED STATES PATENT OFFICE.

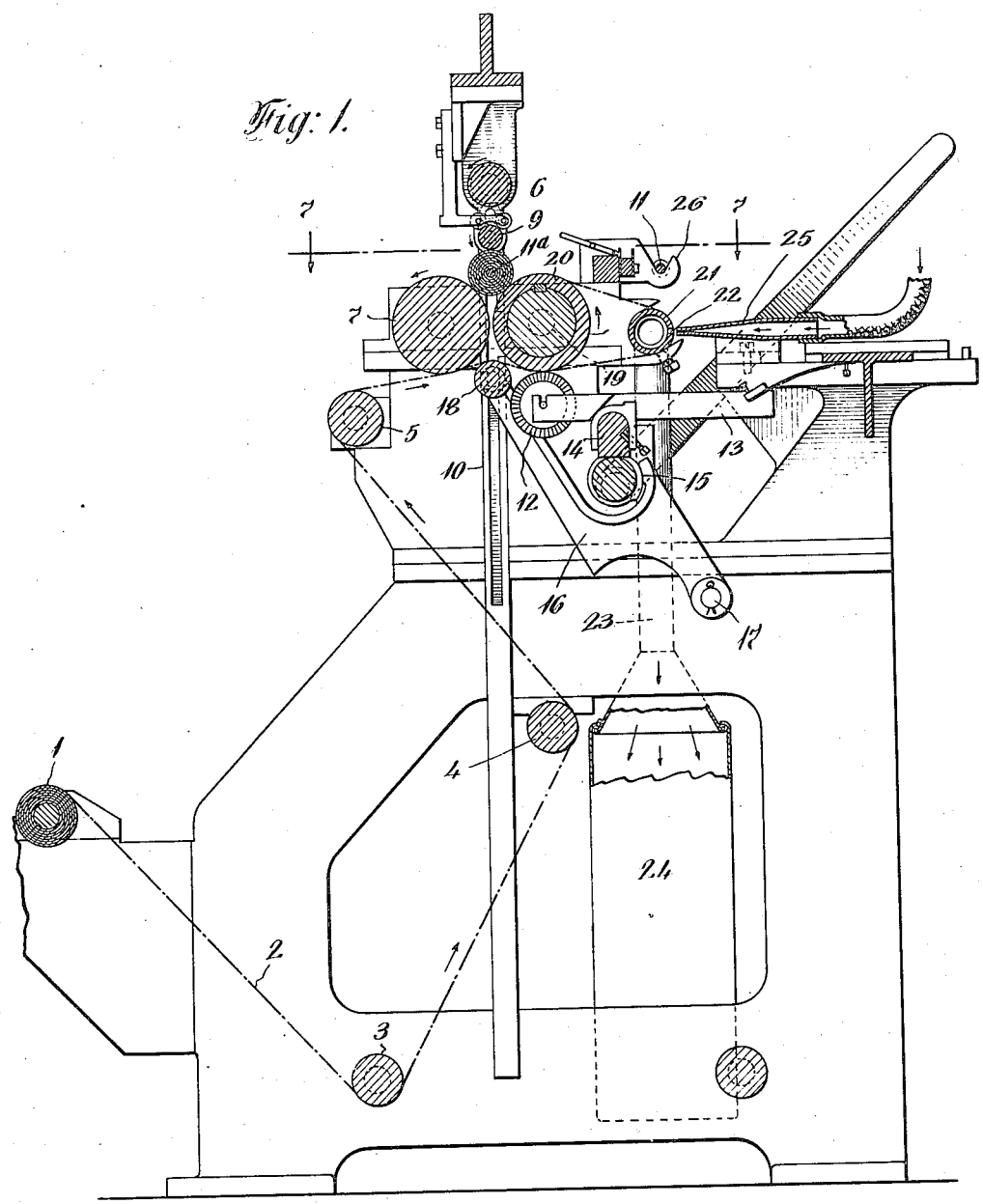

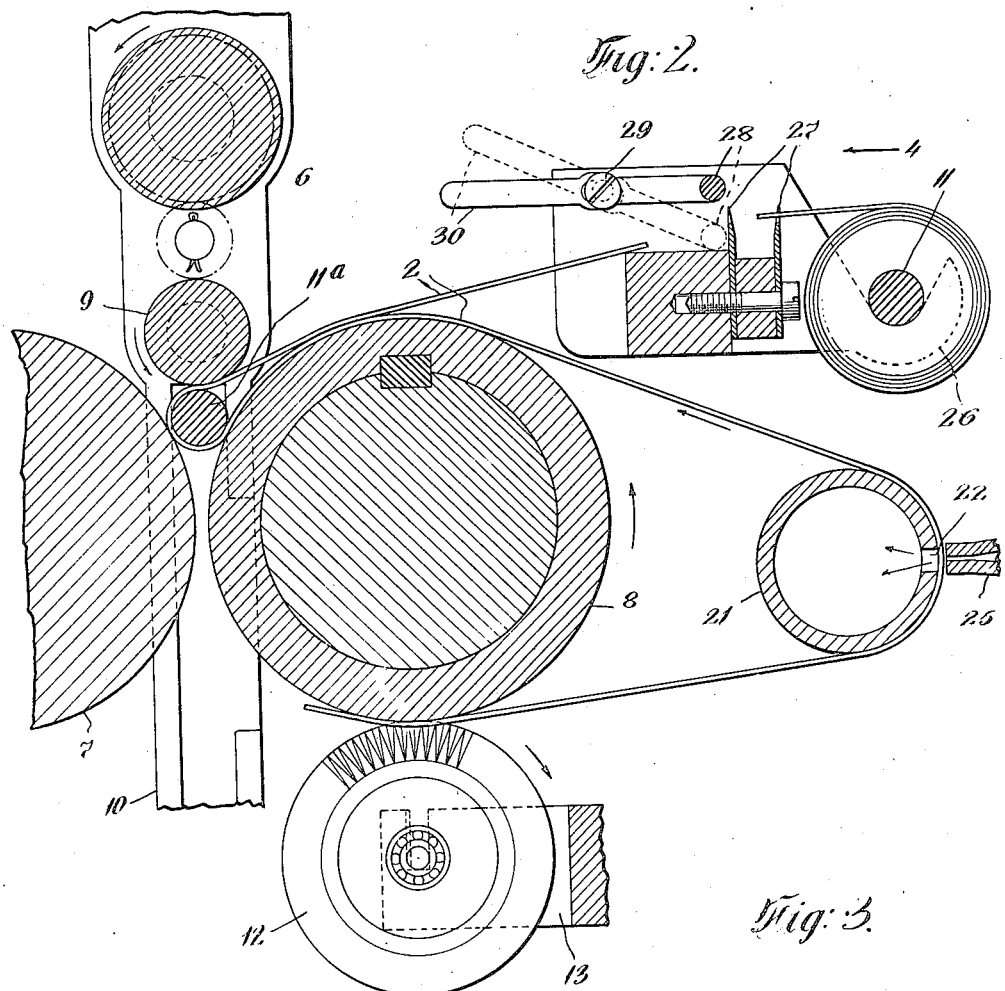
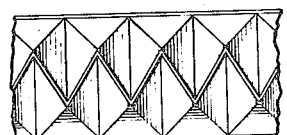
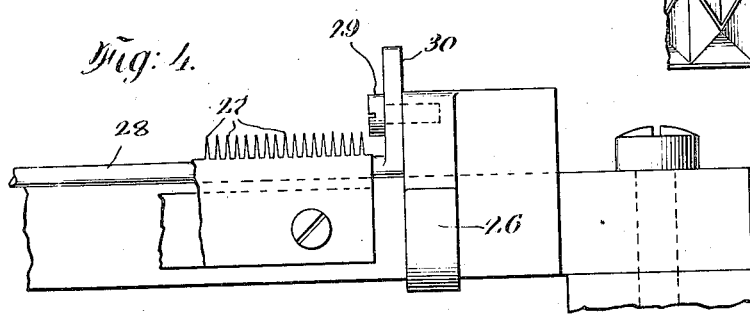

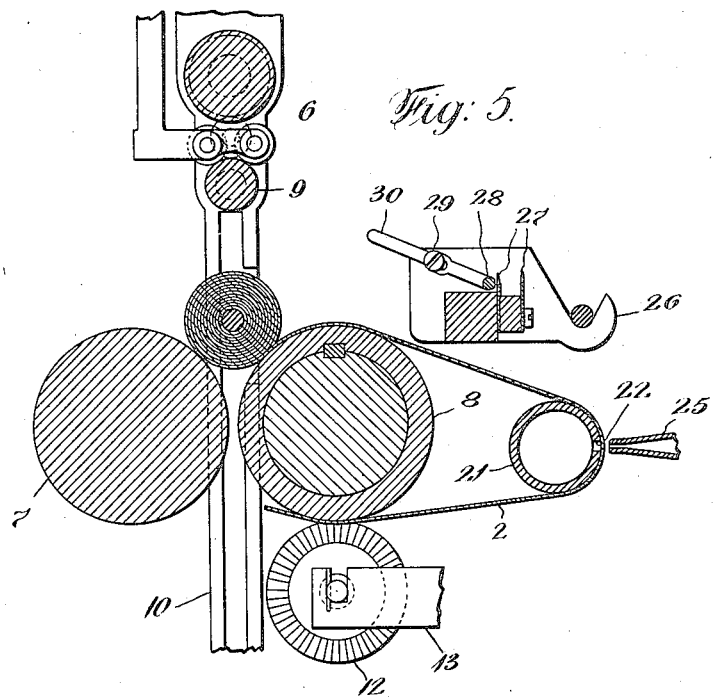
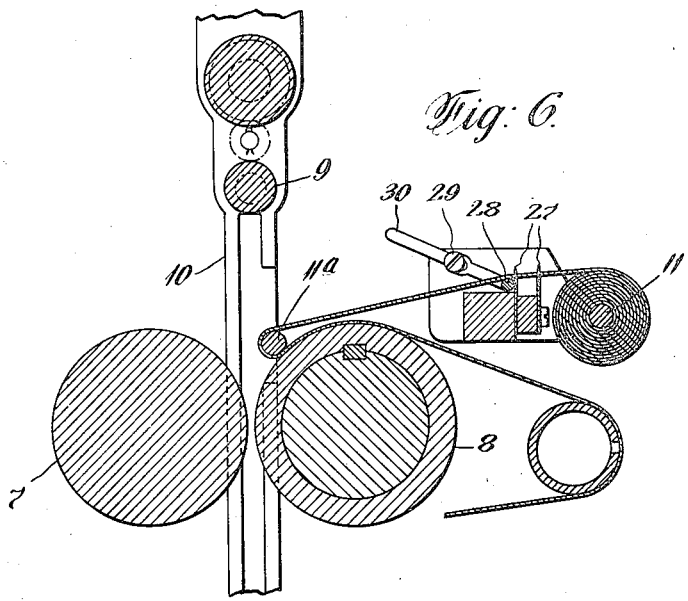

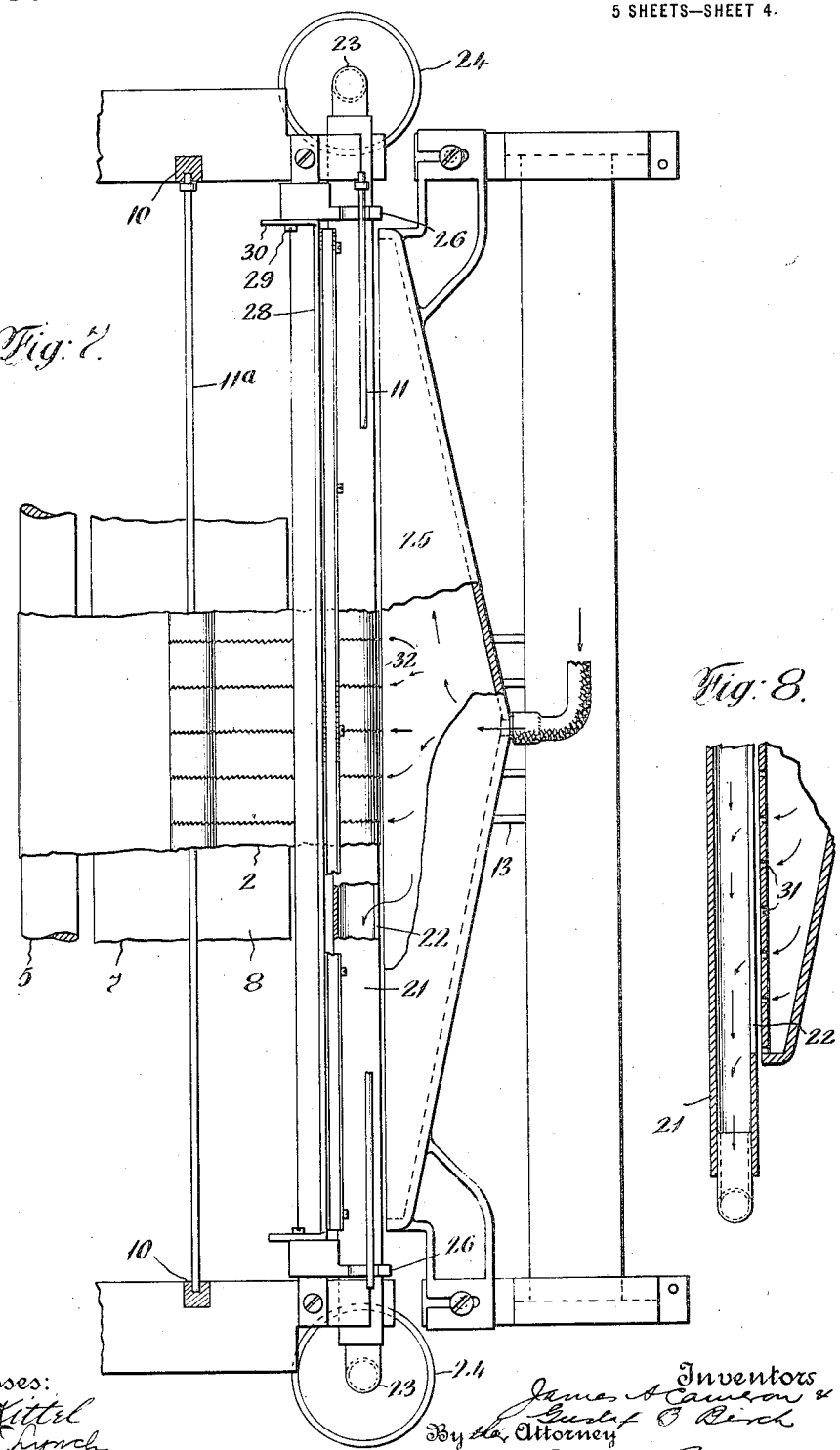

JAMES A. CAMERON AND GUSTAF BIRGER BIRCH, OF BROOKLYN, NEW YORK, ASSIGNORS TO CAMERON MACHINE COMPANY, OF BROOKLYN, NEW YORK, A CORPORATION OF NEW YORK.

MACHINE FOR MAKING SURGEONS' BANDAGES.

1,256,659.   Specification of Letters Patent.   Patented Feb. 19, 1918.

Application filed October 10, 1914. Serial No. 866,012.

*To all whom it may concern:*

Be it known that we, JAMES A. CAMERON and GUSTAF B. BIRCH, both citizens of the United States, and residents of the borough of Brooklyn, in the county of Kings, city and State of New York, have invented certain new and useful Improvements in Machines for Making Surgeons' Bandages, of which the following is a specification.

The present invention relates to devices for making surgeons' bandages.

The main object of this invention is to reduce the number of operations necessary to produce bandages and to obtain as wide a bandage as possible from a given width of web.

In carrying out this invention we employ a process which consists in slitting a web of material lengthwise by severing it with an undulating cut so as to simultaneously destroy the continuity of the warp threads adjacent to the cut and so as to leave a scalloped edge formed by weft threads of unequal length, after which the material is rewound into coils, preferably on a single shaft which when removed enables the operator to knock the coils apart, thereby producing a plurality of finished bandages. The product thus formed is produced by a much smaller number of operations and is of such a character that the edges thereof will not unravel since the outermost warp threads, as described before, are destroyed in the process of slitting the fabric, and the remaining warp threads are held in place by the scalloped edge formed by the weft threads of unequal length.

The product obtained by this process may be characterized as a surgeon's bandage which consists of a strip of material the edges of which are scalloped and formed by weft threads of unequal length recurring at regular intervals and devoid of continuous warp threads or of warp threads of appreciable length.

If desired the severed warp threads may be removed from the bandage before it is rewound, by any suitable means, such as means for causing a blast of air to impinge upon the slitted sections.

In carrying out this process a machine is utilized which is provided with a slitting means located in the path of the moving web for slitting the web lengthwise before winding on undulating lines of severance, thereby acting on the warp and weft threads in the manner described. The slitting means preferably embrace a backing member of suitable character and a rotary cutting member having a tortuous cutting edge.

Other features of construction, combination of parts and arrangement of elements will appear as the specification proceeds.

In the accompanying drawings the invention is disclosed in a concrete and preferred form from which, however, departure may be made without departing from the legitimate and intended scope of the invention as expressed in the appended claims.

In the said drawings:

Figure 1 is a vertical sectional view through a machine which may be utilized in connection with the process.

Fig. 2 is a detail sectional view of the slitting and rewinding means and elements adjacent thereto.

Fig. 3 is an edge view of a portion of the tortuous rotary cutter.

Fig. 4 is a detail view looking in the direction of the arrow 4 of Fig. 2.

Figs. 5 and 6 are sectional views showing stages of operation.

Fig. 7 is a general plan view of the device, on the line 7—7 of Fig. 1, partly in section and broken away for the purpose of clearness of illustration.

Fig. 8 is a detail view showing a modification of the means for causing a blast of air to impinge upon the slitted material.

Similar characters of reference indicate corresponding parts in the different views.

Figure 9:
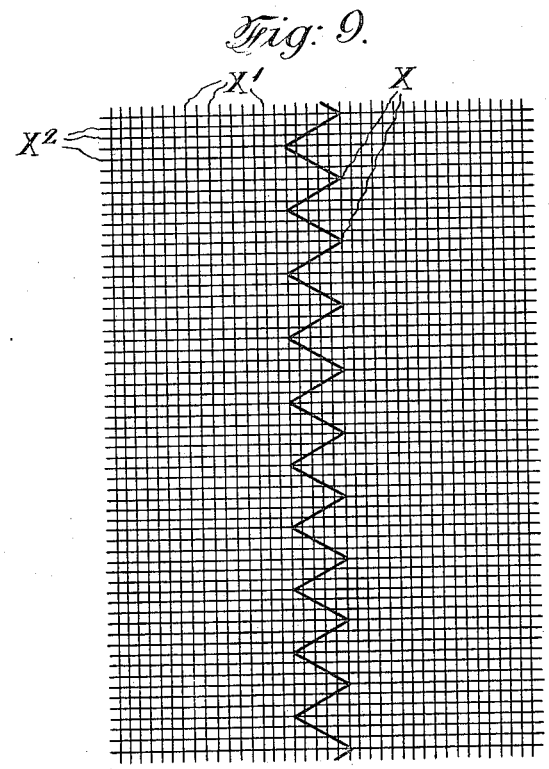
Fig. 9 is a view of a portion of the web showing the undulating line of severance with respect to the warp and weft threads.

1 indicates a web of material from which the bandages are to be made, suitably supported on a roll in the machine, and 2 is the web which is led therefrom over suitable guide rollers 3, 4 and 5. 6 indicates the rewinding mechanism of a well-known form which here consists of two surface rewinding rolls 7 and 8 rotating in the same direction, and a pressure roll 9 mounted to rise as the diameter of the rewound coil increases in a well-known manner. 11ª indicates the rewinding shaft which is placed between the rollers 7, 8 and 9 and on which the slit sections are rewound. The cutting device here consists of the rotary cutting member 12 which is provided with a tortuous cutting edge, as shown best in Fig. 3. There may be a number of these rotary cutting members and they are mounted in brackets 13 hung on the rails 14 in a well-known manner, which rails are adapted to be raised or lowered so as to bring the cutting member 12 into engagement with the roll 8 by means of the cam 15 in a manner well understood in the art. The cam 15 also actuates the lever 16 pivoted at 17 and provided with a tension roll 18 which serves to bring the web of material into engagement with the rolls 7 or 8 or both.

Figure 10:
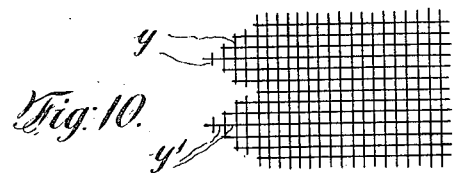
Figs. 10 and 11 show the product obtained by the process and by the machine, Fig. 10 being a view which shows the effect of the undulating cut with the severed warp threads in position and with the scalloped edge formed by the weft threads of unequal length, and Fig. 11 being a view similar to Fig. 10 but with the severed warp threads removed.
Figure 11:
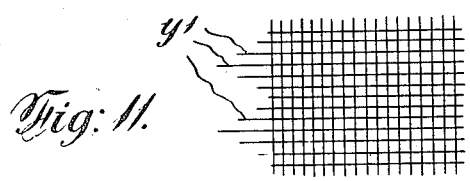

In the present embodiment of the invention one of the rewinding rolls 8 constitutes the backing member for the cutting member 12. This backing member is preferably provided with an inner core 19 and a plurality of outer shells 20 of a material harder than the material of which the rotary cutting member 12 is made, so that the cutting member will not cause indentations in the backing roll. The tortuous cutting edge of the rotary cutting member 12 is preferably blunt, that is to say, it is not a sharp cutting edge since if it were it would be destroyed by coming in contact with the hard outer shells 20. The web of material is led over the guide rolls 3, 4 and 5 and over the tension roll 18 and in between the backing roll 8 and the rotary cutting member 12, which by its action slits the web longitudinally on undulating lines, as indicated by X in Fig. 9. It will be noted that this undulating cut will sever a number of the warp threads $X^1$ adjacent to the lines of cutting, the remains of which may be seen at Y in Fig. 10. And at the same time the undulating cut will sever the weft threads $X^2$ in such a manner as to leave a scalloped edge formed by weft threads of unequal length recurring at regular intervals, as shown at $Y^1$ in Figs. 10 and 11. The material may then pass around the roller 8 and to the rewinding shaft which rewinds the slitted sections side by side into a plurality of coils. When a sufficient diameter of material has been rewound the shaft 11 is removed from the machine and the coils removed therefrom. If desired, the web may be led over the hollow guide roller 21, which is interposed in the line of travel between the slitting means and the rewinding means and which is open to the atmosphere, as shown at 22. From thence the web may pass back to the upper portion of the roller 8 and then to the rewinding shaft 11. This hollow guide roll 21 is in communication, by means of suitable piping at 23, with the containers or tanks 24, and an air nozzle 25 of suitable construction is arranged adjacent to the open portion of the hollow guide roller 21 so that as the web travels over the said guide roller 21 the air will blow the severed warp threads into the interior of the said roll 21 and thence into the tanks 24. The tanks 24 may be provided with suitable screening means for retaining the particles of the warp threads and for permitting the escape of the air in a well-known manner.

In order to facilitate the removal of the coils when the requisite diameter has been reached and to quickly sever the slitted sections transversely from the web, and for substituting a new rewinding shaft, we provide a bracket 26 at a point in advance of the rewinding means, which bracket is adapted to receive rewinding shaft 11 containing the rewound slitted sections integral with the web of material. To make this plain it will be understood that when the coil has reached, say the diameter shown in Fig. 5, it may then be removed and placed in the bracket 26, as shown in Fig. 6. A second rewinding shaft 11ª is then inserted in the rewinding means to maintain the slitted sections of the web in threaded relation to the rewinding means so that when the web is severed transversely between the two rewinding shafts the renewed operation of the machine will continue the rewinding of the material on the new shaft 11ª and will thus obviate the necessity of the slow and careful threading of the web into the new shaft and into the new rewinding mechanism.

Preferably there is provided in connection with the bracket 26 two rows of pins 27 spaced apart and which may be in the form of the well-known combs, as shown more particularly in Fig. 4. These pins are interposed between the bracket 26 and the rewinding means and when the shaft 11 is removed from the rewinding means and placed in the bracket 26, these pins 27 will pierce the material, as shown in Fig. 6, and will thus form a line transversely of the web which will render the severance of the web along a definite line easy of accomplishment. The slitted sections may now be severed from the web by running a knife across the said web between the two rows of transversely extending pins 27, the result of which is shown in Fig. 2, when power may again be applied to the machine and the rewinding be continued on the shaft 11ª. In order to facilitate the removal of that portion of the slitted section which is integral with the web after it has been severed there is provided a transversely extending bar 28 adjacent to one of the rows of pins 27. This bar 28 is pivotally mounted at 29 and may be provided with a handle 30 for manipulation so that by the simple process of depressing the handle 30 the integral sections of the web may be quickly disengaged after the web has been severed transversely. This is plainly illustrated in Fig. 2.

In Fig. 8 is shown a slight modification of the device for removing the severed warp threads, which modification consists merely in providing the nozzle 25 with a plurality of openings 31 opposite to slits in web instead of with a continuous slot 32, as shown in Fig. 7.

The rewinding shafts 11 and 11ª, or as many others as may be desired, are adapted to engage in the guides 10 so as to rise with an increase in the rewound material. This is more particularly illustrated in Fig. 7.

What is claimed is:

1. In a machine of the character set forth, means for slitting a web, rewinding means including a removable rewinding shaft, a bracket located in advance of the rewinding means adapted to receive a rewinding shaft containing rewound slitted sections integral with the web, and a second rewinding shaft inserted in the rewinding means to maintain the slitted sections in threaded relation to the rewinding means when the web is severed transversely between the two rewinding shafts.

2. In a machine of the character set forth, means for slitting a web, rewinding means including a removable rewinding shaft, a bracket located in advance of the rewinding means adapted to receive a rewinding shaft containing rewound slitted sections integral with the web, two spaced rows of pins extending transversely of the web and interposed between the rewinding means and the bracket aforesaid which pierce the slitted sections when the rewinding shaft is placed in the bracket aforesaid and which constitute a guide for determining the transverse severance of the web, and a second rewinding shaft inserted in the rewinding means to maintain the slitted sections in threaded relation to the rewinding means when the web is severed tranversely between the two rows of pins.

3. In a machine of the character set forth, means for slitting a web, rewinding means including a removable rewinding shaft, a bracket located in advance of the rewinding means adapted to receive a rewinding shaft containing rewound slitted sections integral with the web, two spaced rows of pins extending transversely of the web and interposed between the rewinding means and the bracket aforesaid which pierce the slitted sections when the rewinding shaft is placed in the bracket aforesaid and which constitute a guide for determining the transverse severance of the web, a second rewinding shaft inserted in the rewinding means to maintain the slitted sections in threaded relation to the rewinding means when the web is severed transversely between the two rows of pins, and means for disengaging the integral sections of the web from one of said rows of pins after the web is severed transversely.

Signed at New York city, in the county of New York and State of New York, this 9th day of October, A. D. 1914.

JAMES A. CAMERON.
GUSTAF BIRGER BIRCH.

Witnesses:
AXEL V. BEEKEN,
TERESA V. LYNCH.